United States Patent [19]

Winnek

[11] Patent Number: 4,491,956
[45] Date of Patent: Jan. 1, 1985

[54] METHOD AND APPARATUS FOR MAKING THREE-DIMENSIONAL RADIOGRAPHS

[76] Inventor: Douglas F. Winnek, 10450 W. Loyola Dr., Los Altos Hills, Calif. 94022

[21] Appl. No.: 416,743

[22] Filed: Sep. 10, 1982

[51] Int. Cl.³ .............................................. G03B 41/16
[52] U.S. Cl. ........................................ 378/41; 378/146
[58] Field of Search ................... 378/41, 42, 145, 62

[56] References Cited

U.S. PATENT DOCUMENTS

| 3,382,362 | 5/1968 | Tokuyama | 378/41 |
| 3,783,282 | 1/1974 | Hoppenstein | 378/41 |
| 4,404,471 | 9/1983 | Wennek | 378/41 |

*Primary Examiner*—Craig E. Church
*Attorney, Agent, or Firm*—Townsend and Townsend

[57] ABSTRACT

A method and apparatus for making X-ray photographs which can be viewed in three dimensions with the use of a lenticular screen. The apparatus includes a linear tomograph having a moving X-ray source on one side of a support on which an object is to be placed so that X-rays can pass through the object to the opposite side of the support. A movable cassette on the opposite side of the support moves in a direction opposite to the direction of travel of the X-ray source as the source moves relative to the support. The cassette has an intensifying screen, a grating mask provided with uniformly spaced slots for passing X-rays, a lenticular member adjacent to the mask, and a photographic emulsion adjacent to the opposite side of the lenticular member. The cassette has a power device for moving the lenticular member and the emulsion relative to the mask a distance equal to the spacing between a pair of adjacent slots in the mask. The X-rays from the source, after passing through an object on the support, pass into the cassette through the slots of the mask and are focused on the photographic emulsion to result in a continuum of X-ray views of the object. When the emulsion is developed and viewed through the lenticular member, the object can be seen in three dimensions.

9 Claims, 3 Drawing Figures

METHOD AND APPARATUS FOR MAKING THREE-DIMENSIONAL RADIOGRAPHS

BACKGROUND OF THE INVENTION

A conventional radiograph is a two-dimensional representation of a three-dimensional object. Special procedures are used by a radiologist to delineate depth, contour and spatial relationships of structure when viewing the two-dimensional image of a radiograph. In doing so, the radiologist makes a number of assumptions which limit the accuracy of the conclusions arrived at when the two-dimensional radiograph is studied. Because of this drawback, there has been a long felt need for a simple, more direct and less time-consuming technology and one in which a radiograph can be viewed in three dimensions rather than two dimensions.

SUMMARY OF THE INVENTION

The present invention satisfies the aforesaid need by providing a method and apparatus for taking three-dimensional X-ray photographs of body so that depths, contours and spatial relationships of structures within a body can be observed by looking at a resulting radiograph. Thus, the present invention represents a distinct advance over the existing X-ray technology.

The invention uses a linear tomograph having an improved cassette associated therewith. The tomograph includes a movable X-ray source which moves in one direction from a first position to a second position on one side of a support on which an object to be X-rayed is placed. The cassette is mounted on the opposite side of the support and moves in a direction opposite to the one direction from a first location to a second location as the X-ray source moves from the first position to the second position thereof.

The cassette includes a grating mask having uniformly spaced slots therethrough which are transparent to X-rays. A photographic film having an emulsion is spaced from the mask near the rear of the cassette, and a lenticular member is mounted between the mask and the photographic emulsion so that X-ray beams will pass through the slots and be focused on the emulsion by the lenticular member.

The lenticular member and the photographic film are movable together relative to the mask, and means is provided for moving them a distance equal to the distance between a pair of adjacent slots in the mask when the cassette moves from its first location to its second location. This movement causes a continuum of X-rays images to be focused onto and to expose the photographic emulsion of the film as the cassette moves relative to the support. When the photographic emulsion is developed and the images thereon are viewed through a lenticular member, images of the object will be seen in three dimensions.

The primary object of the present invention is to provide a method and apparatus for making three-dimensional X-ray photographs wherein a moving X-ray beam passing through an object will pass through a grating mask, a lenticular member and a photographic film to expose the emulsion on the film in a manner to form a continuum of X-ray images on the emulsion so that, when the emulsion is viewed through the lenticular member, the various locations in the object can be seen in three dimensions to provide a greater amount of information about the object than is available using coinventional radiographic techniques.

Another object of the present invention is to provide a method and apparatus of the type described wherein the teachings of the invention can be carried out with a linear tomograph having a cassette which includes the lenticular member and the emulsion and means for moving the lenticular member and the emulsion relative to the mask through a predetermined distance as the cassette moves relative to the object to be X-rayed so that the continuum of X-ray images will be formed on the emulsion in a single excursion of the cassette.

Other objects of this invention will become apparent as the following specification progresses, reference being had to the accompany drawings.

IN THE DRAWINGS

Figure 1:
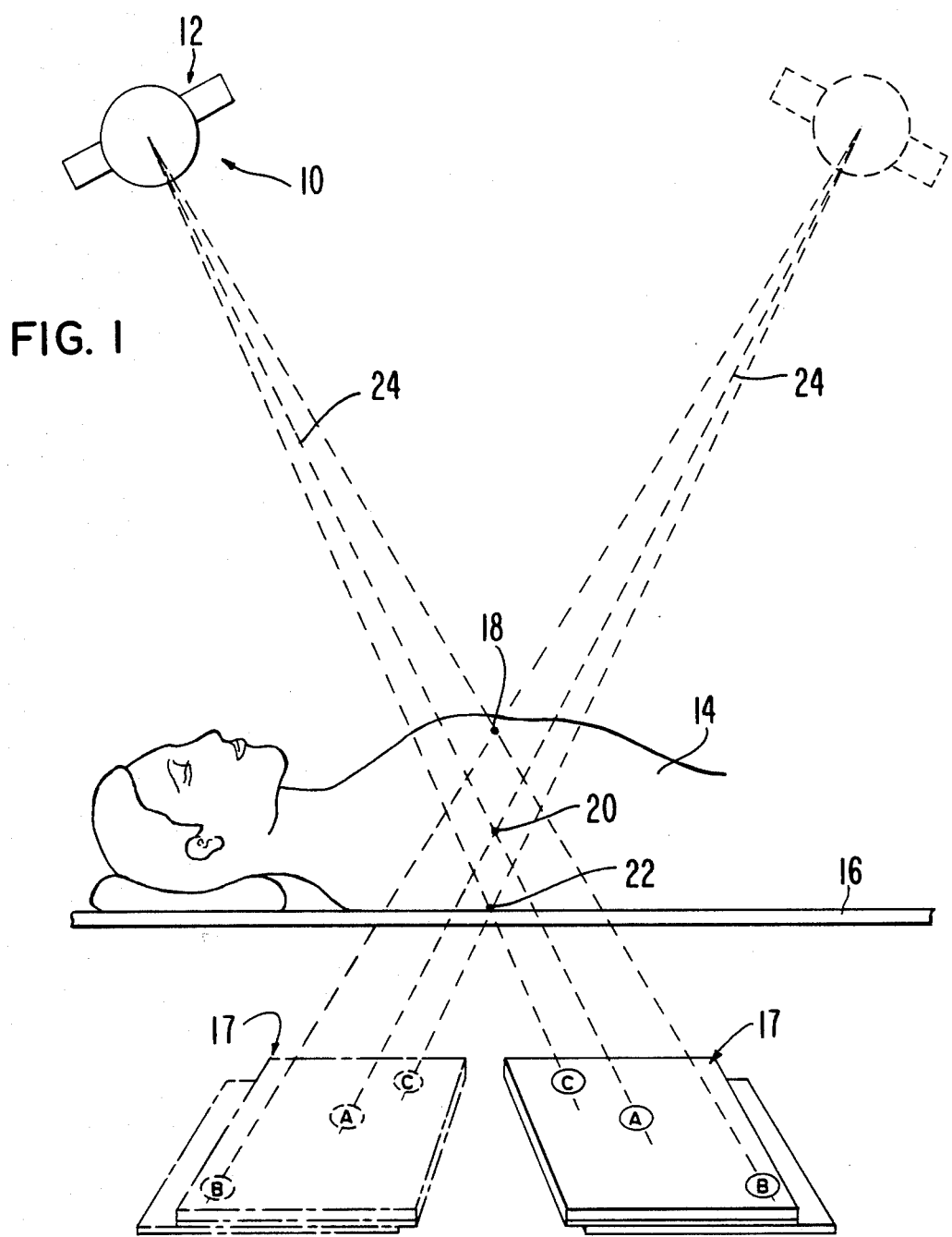
FIG. 1 is a schematic view of a linear tomograph showing the way in which a three-dimensional radiograph is made in accordance with the teachings of the present invention.

The linear tomograph of the present invention includes a source 10 of X-rays which move from left to right when viewing FIG. 1. The dashed line position in FIG. 1 of source 10 indicates that the source has moved from the full line position to the dashed line position in one excursion of the tomograph. The X-rays themselves are denoted by the numeral 12 and are adapted to pass through a patient 14 on a support 16. An X-ray film cassette 18 is below support 16 and moves from right to left from the full line position to the dashed line position as source 10 moves from left to right.

As shown in FIG. 1, X-ray beams pass through three points 20, 22, and 24 of patient 14 and these three beams are directed into cassette 18 to expose the emulsion of an X-ray film therein. The film will be described hereinafter in more detail.

Figure 2:
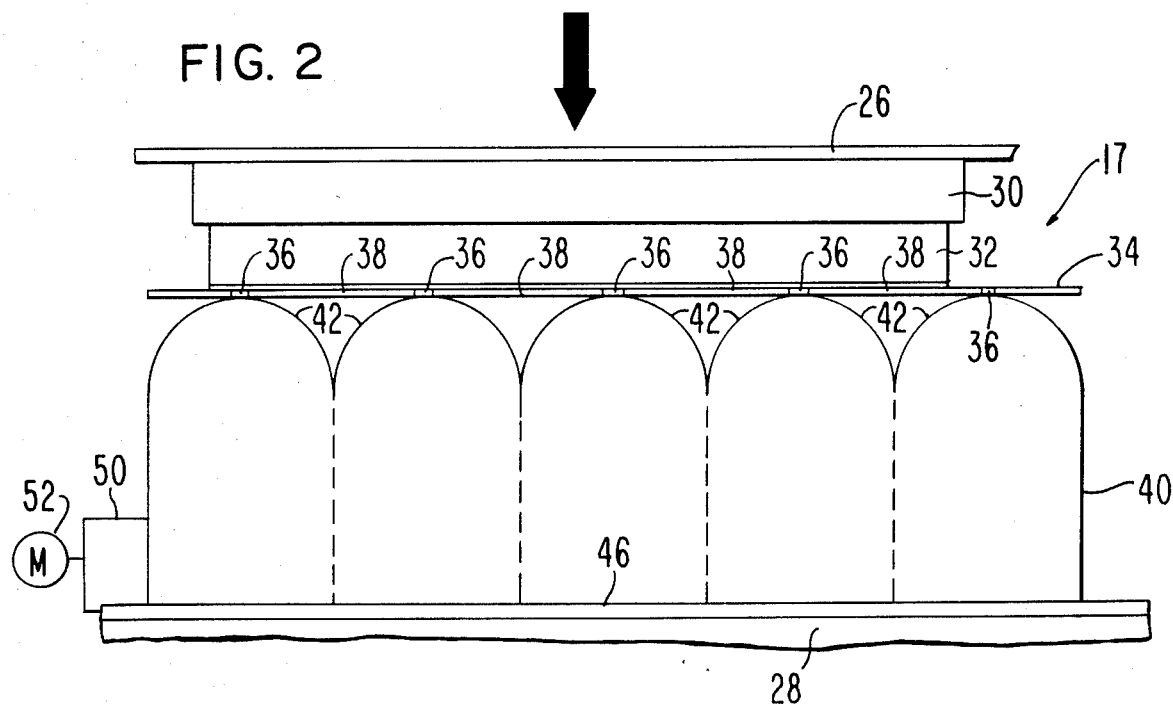
FIG. 2 is an enlarged, fragmentary, cross-sectional view of the cassette assembly of the tomograph.

The X-ray cassette 17 is shown in a cut-away form in FIG. 2 and includes a shell provided with a front wall 26 and a rear wall 28. A cushion 30 is on the inner surface of front wall 26. A high resolution intensifying screen 32 is adjacent to cushion 30 and is forwardly of a grating 34 having slots 36. The slots 36 are transparent to X-rays but the regions 38 between adjacent slots 36 are opaque to the X-rays.

A lenticular member 40 having lenticular ridges 42 is rearwardly of grating 34. An X-ray film 46 having an emulsion is at the rear flat face of member 40 and film 46 is immediately forwardly of rear wall 28 of the cassette.

Means is provided to move member 40 and film 46 relative to grating 34 as the cassette 17 moves from right to left when viewing FIG. 1. Such means can take any suitable form. For purposes of illustration, the means includes a support 50 (FIG. 2) attached in some way to lenticular member 40 and to film 46. A motor 52 is attached to support 50 and moves the same one pitch line, i.e., the distance between a pair of adjacent slots 36 of mask 34, relative to cassette 17 during a full excursion of the tomograph.

Figure 1A:
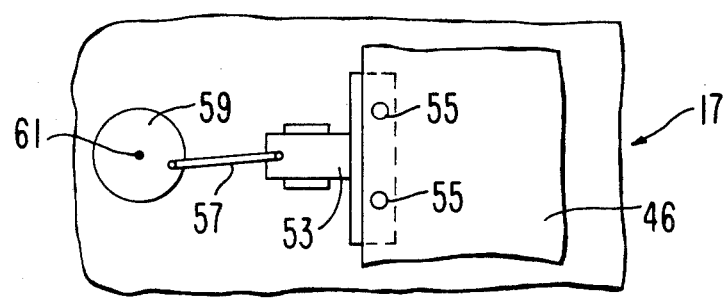
FIG. 1a is an enlarged, fragmentary top plan view of a part of the cassette assembly used with the tomograph.

In a simple embodiment of the invention, the motor 52 can be attached to a T-bar 53 (FIG. 1a) provided with a pair of spaced pins 55 thereon. The lenticular member 40 with photographic film attached the rear flat face thereof can be provided with a pair of holes which receive the pins 55. Member 40 and photographic film 46 are pulled in one direction by the operation of the motor, the motor drive shaft 61 being coupled by an eccentrically mounted link 57 and a rotor 59 to the bar so that the member 40 and the film 46 move relative to grating 34 a distance of one pitch line during a cycling of motor 52.

When the X-rays enter the cassette, they pass through slots 36 and are focused by ridges 42 on film 46. Since the film and lenticular member 40 move relative to grating 34, the result in a succession or continuum of X-ray views of the body of patient through which the X-rays pass when the patient is on support 16. The photograph is made with only a single excursion of the tomograph and exposure period is approximately 1 second at normal MAS (milliampere-seconds).

Figure 3:
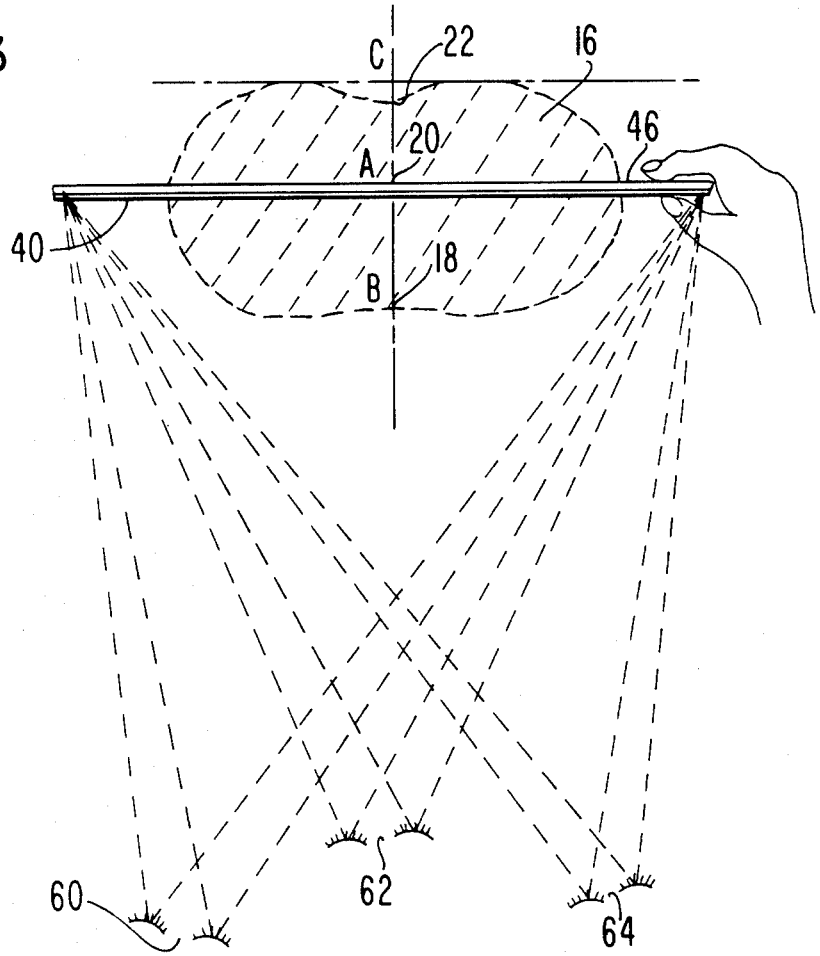
FIG. 3 is a schematic view showing the way in which the radiograph is observed and interpreted.

After normal processing, usually in a 90 second film processor, the picture or radiograph, when viewed through the lenticular member reveals a three-dimensional panorama of the object and its internal structures, cavities and inclusions. This is shown in FIG. 3 wherein the images of the patient at points 18, 20 and 22 (FIG. 1) are viewed through a lenticular screen 40 and film 46 with the film being attached to the screen. The points 18, 20, and 22 are seen in relief when the viewer's eyes are at locations 60, 62, and 64. Upon moving from one side to the other, the observer looks around and beyond points 18, 20 and 22 so that the observer sees depths, contours, and spatial relationships all clearly revealed for the clinical diagnostician and with magnified orthoscopic accuracy.

Radiographs made by the practice of the present invention become permanent graphic records for the diagnostician. Precise measurements of depth, lengths, widths, and movements may be read directly from the radiograph. The radiograph is a faithful representation of the full dimensions of various objects and their internal parts. The radiographs provide abundantly more clinical information than is available from a conventional X-ray photograph.

While the description with respect to FIG. 2 indicates that member 40 and film 46 are separate from each other, it is possible to coat the rear flat face of member 40 with the photographic emulsion and to expose and develop the emulsion while it remains attached to member 40. In this way, when it is desired to view the film, the lenticular screen is viewed through the ridges 40 to the emulsion 46.

In a simple embodiment of the invention, the motor 52 can be attached to a T-bar 53 (FIG. 1a) provided with a pair of spaced pins 55 thereon. The lenticular member 40 with photographic film attached the rear flat face thereof can be provided with a pair of holes which receive the pins 55. Member 40 and photographic film 46 are pulled in one direction by the operation of the motor, the motor drive shaft 61 being coupled by an eccentrically mounted link 57 and a rotor 59 to the bar so that the member 40 and the film 46 move relative to grating 34 a distance of one pitch line during a cycling of motor 52.

What is claimed is:

1. An improved X-ray tomograph comprising: a support on which an object to be photographed is placed; an X-ray source on one side of the support and movable in one direction relative to the support from a first position to a second position while delivering X-rays in the direction of the support; a film cassette on the opposite side of the support and movable in a direction opposite to said one direction from a first location to a second location as the X-ray source moves from the first position to the second position, whereby X-rays from the source can pass through the object on the support and into the cassette, said cassette containing a grating mask having a plurality of slots transparent to X-rays, a photographic film having an emulsion, and a lenticular member between the mask and the emulsion, said cassette having means for moving the lenticular member and the photographic film relative to the mask as the cassette moves from the first location to the second location.

2. An improved X-ray tomograph as set forth in claim 1, wherein the lenticular member and the emulsion move a distance equal to the distance between each pair of slots in the mask as the cassette moves from the first location to the second location.

3. An improved X-ray tomograph as set forth in claim 1, wherein the photographic film is separate from the lenticular member.

4. An improved X-ray tomograph as set forth in claim 1, wherein the lenticular member has a flat rear surface, the emulsion being applied as a film to the surface so that the lenticular member and the emulsion form a single unitary construction.

5. An improved X-ray tomograph as set forth in claim 1, wherein said moving means includes a motor carried by the cassette and being coupled with the lenticular member and the photographic film for moving the same relative to the mask.

6. An improved X-ray tomograph as set forth in claim 5, wherein the cassette has a T-bar shiftably mounted thereon, the T-bar having a pair of pins, the lenticular member and the photographic film having a pair of holes therethrough for receiving the pin, and a link coupling the T-bar with the motor for moving the T-bar when the motor is energized.

7. A method of making X-ray photographs of an object comprising: moving an X-ray source in one direction from a first position to a second position while directing X-rays through a three-dimensional object; moving a cassette in a direction opposite to said one direction from a first location to a second location as the X-ray source moves from the first position to the second position; providing a cassette containing a grating mask, a photographic film with an emulsion and a lenticular member between the mask and the emulsion; placing the cassette on the opposite side of the object from the source; moving the cassette in a direction opposite to said one direction from a first location to a second location as the source moves in said one direction from said first position to said second position, whereby X-rays from the source will pass through the object and into the cassette; and moving the lenticular member and the photographic film relative to the mask as the cassette moves from the first location to the second location.

8. A method as set forth in claim 7, wherein the lenticular member and the photographic film move a distance equal to the spacing between a pair of slots in the mask.

9. A method as set forth in claim 7, wherein is included the step of focusing the X-rays on the emulsion as the emulsion moves relative to the mask, whereby the emulsion will be provided with a continuum of X-ray photographs which can be reviewed through a lenticular member to provide a three-dimensional image of the object.

* * * * *